UNITED STATES PATENT OFFICE.

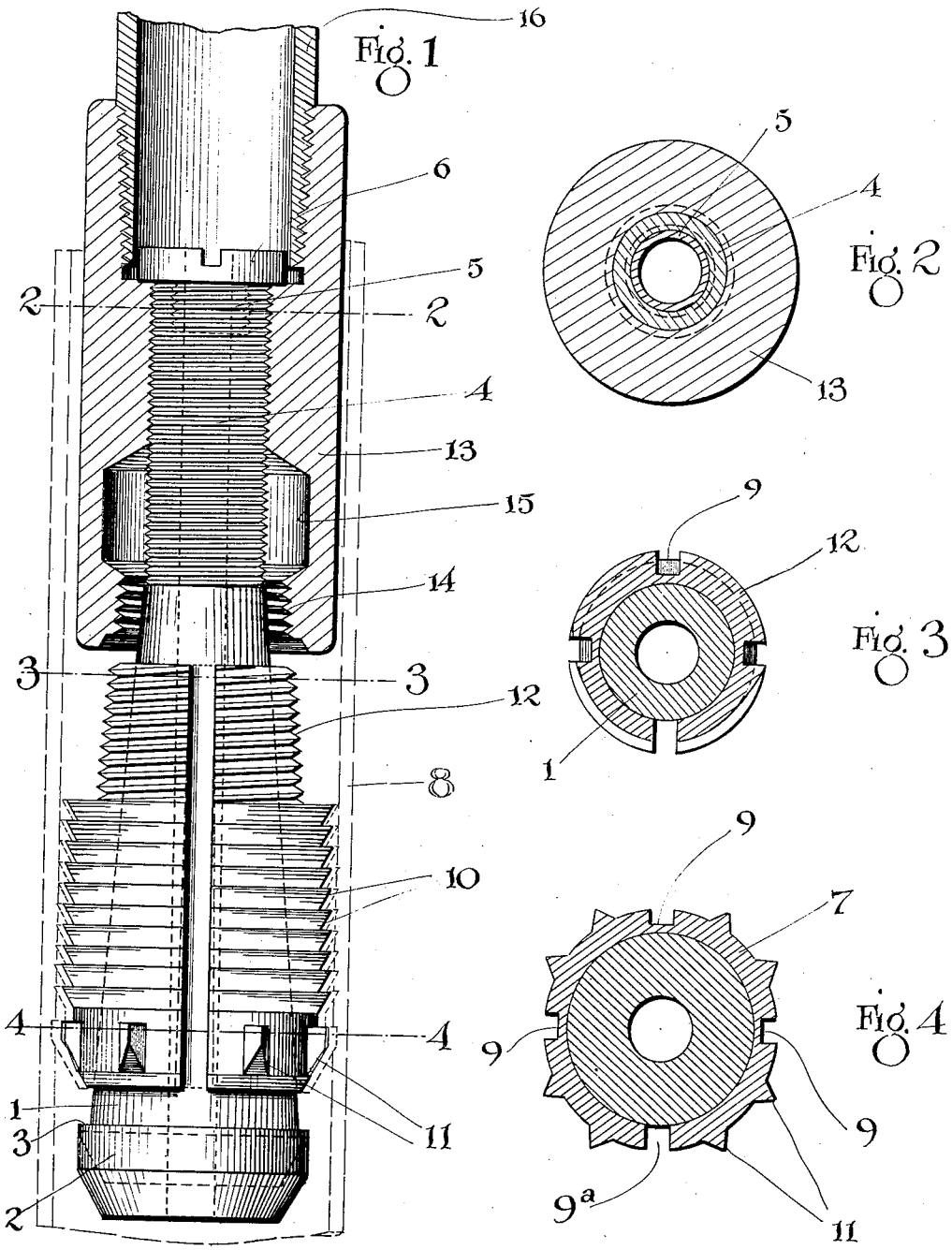

LEE WILKINSON, OF SOURLAKE, TEXAS.

PIPE-FISHING TOOL.

1,358,807. Specification of Letters Patent. Patented Nov. 16, 1920.

Application filed March 29, 1920. Serial No. 369,503.

*To all whom it may concern:*

Be it known that I, LEE WILKINSON, a citizen of the United States, and a resident of Sourlake, in the county of Hardin and State of Texas, have invented certain new and useful Improvements in Pipe-Fishing Tools, of which the following is a specification.

My invention is an improvement in pipe fishing tools, and has for its object to provide a tool of the character specified, by means of which a pipe may be easily and quickly grasped for withdrawal from the well, and without danger of being accidentally released after it is grasped, and wherein means is also provided for permitting the pipe to be released if desired after it has been grasped.

In the drawings:

Figure 1 is a vertical section of the improved fishing tool,

Figs. 2, 3 and 4 are sections on the lines 2—2, 3—3 and 4—4, respectively of Fig. 1.

In the present embodiment of the invention, a tapered mandrel 1 is provided, having at its large end a head 2, an annular shoulder 3 being provided between the head and the body of the mandrel, and the other or small end of the mandrel is provided with a threaded stem 4 which is cylindrical, being of uniform cross section.

That end of this stem remote from the body of the mandrel has an internally threaded recess which is engaged by a screw 5 having a head 6, which is of greater diameter than the stem. Upon this mandrel there is provided a gripping dog or slip 7, in the form of a tapering sleeve having on its outer face teeth for gripping within the pipe, indicated at 8.

This sleeve 7 is grooved longitudinally as shown at 9, and one of the grooves indicated at 9ª is cut through so that the sleeve is a split sleeve and may expand and contract in moving down and up the mandrel.

Referring to Fig. 4, it will be seen that the grooves 9 are at angles of 90° with respect to each other, three being provided, the split 9ª being at the position that will be occupied by the fourth groove. As shown in Figs. 1 and 4, the slip is annularly grooved to form teeth 10 which face upwardly, so that the sharp edges of the teeth will grip within the pipe, and near its lower end the slip has outwardly extending teeth 11 which extend longitudinally of the slip. That portion of the slip near its upper end is externally threaded as indicated at 12, with a coarse thread, for a purpose to be presently described.

A sleeve 13 is mounted on the upper end of the mandrel, the said sleeve being internally threaded as shown to engage the mandrel, and the lower end of the bore is flaring and internally threaded as shown at 14, to fit the portion 12 of the mandrel. Just above this threaded portion 14, the bore of the sleeve is enlarged or counter-bored as shown at 15, and at its upper end the bore of the sleeve is counter-bored taperingly for engagement by the tapered lower end of the drill stem 16. The screw 5 fits within this taper or counter-bore for the drill stem and acts as a lock nut to prevent accidental disengagement of the sleeve from the mandrel. The mandrel is cored or bored longitudinally so that water may pass freely from the stem, through the bore of the mandrel.

In operation, in fishing for the tool, the parts are arranged as shown in Fig. 1. When the tool engages within the upper end of the pipe, as shown in Fig. 1, the drill stem is drawn upward, the slip will move downward on the mandrel and will be expanded to cause the teeth 10—11 to tightly grip the inner surface of the pipe.

The harder the strain or pull on the mandrel, the more closely are the teeth engaged with the pipe. It is sometimes desirable to release the pipe before it has been withdrawn, and in order to permit this to be done from the top of the ground, the drill stem is lowered, carrying with it the mandrel, the mandrel being moved downward by the weight of the stem until the threads 14 of the sleeve engage the threads 12 of the slip When now the drill stem is turned slightly clockwise, these threads will engage, and the sleeve 13 will be connected with the slip, and hold the slip elevated so that it will not be expanded by the mandrel when the drill stem moves upward. In the event that the mandrel sticks in the slip due to the hard pull which has been previously exerted on it, and will not drop down to permit the threads 14 and 12 to engage, then the drill stem is rotated to the right, that is, clockwise and the sleeve 13 is turned down on the mandrel, the mandrel being locked from rotation by the slip engaging the pipe.

When the threads on the sleeve engage the threads on the mandrel, and this turning operation is continued, the slip will be drawn upward with respect to the mandrel due to the coarser thread 12—14. The teeth 11 extend radially outward slightly farther than the teeth 10, and they tend to prevent rotation of the slip within the pipe.

The screw 6 is for the purpose of preventing the mandrel from becoming unscrewed from the sleeve, and this screw is bored longitudinally as indicated in dotted lines to permit the passage of water.

With the ordinary construction of fishing tool, when it is found after engaging the tool that the pipe cannot be pulled, either the pipe has to be shot off with a charge of explosive, or the tool must be left in the well.

The threads 12 on the upper end of the sleeve and the threads 14 on the lower end of the sleeve can be coarse, fine or double, or of greater or less pitch, as may be desired.

I claim—

1. A fishing tool comprising a tapering mandrel and a tapering split sleeve mounted thereon and having external teeth, the upper end of the sleeve being externally threaded, and that portion of the mandrel above the external thread being cylindrical and threaded with a finer thread, a sleeve threaded onto the cylindrical portion of the mandrel and having a flaring internally threaded lower end for engaging the coarse thread of the sleeve, said sleeve having means for engaging the drill stem to connect the sleeve with the stem.

2. In combination a tapering mandrel and a slip or gripping dog slidable on the mandrel to be expanded when moved in one direction and contracted when moved in the other, means for limiting the movement of the slip toward expanding position, said slip having its small end tapering, and a sleeve threaded onto the other end of the mandrel, said other end being cylindrical and having a tapering recess at its lower end for engaging the threaded portion of the slip, said threaded portion of the slip being a coarser thread than the thread of the sleeve which engages the mandrel.

3. In combination a tapering mandrel and a slip or gripping dog slidable on the mandrel to be expanded when moved in one direction and contracted when moved in the other, means for limiting the movement of the slip toward expanding position, said slip having its small end tapering, and a sleeve threaded onto the other end of the mandrel, said other end being cylindrical and having a tapering recess at its lower end for engaging the threaded portion of the slip.

4. In combination a tapering mandrel and a slip or gripping dog slidable on the mandrel to be expanded when moved in one direction and contracted when moved in the other, said slip having its small end tapering, and a sleeve threaded onto the other end of the mandrel, said other end being cylindrical and having a tapering recess at its lower end for engaging the threaded portion of the slip.

5. In combination, a tapering mandrel and a slip slidable thereon to expand when moved in one direction and to contract when moved in the other direction, said slip having its small end tapering and threaded, and a sleeve having threaded engagement with the mandrel, said mandrel having a cylindrical portion for engagement by the sleeve, and the sleeve having a tapering threaded recess for engaging the threaded portion of the slip, said threaded portion of the slip having a coarser thread than the thread between the sleeve and the mandrel, and the sleeve being adapted for connection with a lowering means rigidly connected with the sleeve to permit the sleeve to be turned with the said lowering means.

6. In combination, a tapering mandrel and a slip slidable thereon to expand when moved in one direction and to contract when moved in the other direction, said slip having its small end tapering and threaded, and a sleeve having threaded engagement with the mandrel, said mandrel having a cylindrical portion for engagement by the sleeve, and the sleeve having a tapering threaded recess for engaging the threaded portion of the slip, said threaded portion of the slip having a coarser thread than the thread between the sleeve and the mandrel.

7. In combination, a tapering mandrel and a slip slidable thereon to expand when moved in one direction and to contract when moved in the other direction, said slip having its small end tapering and threaded, and a sleeve having threaded engagement with the mandrel, said mandrel having a cylindrical portion for engagement by the sleeve, and the sleeve having a tapering threaded recess for engaging the threaded portion of the slip.

LEE WILKINSON.